Oct. 15, 1968   R. F. HATTER   3,405,805
FILTER
Filed Dec. 19, 1966
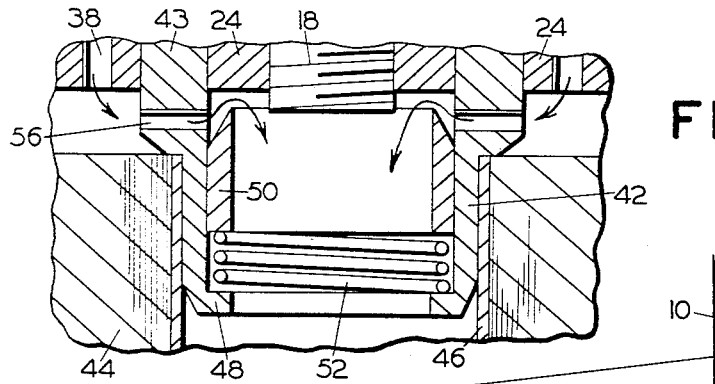
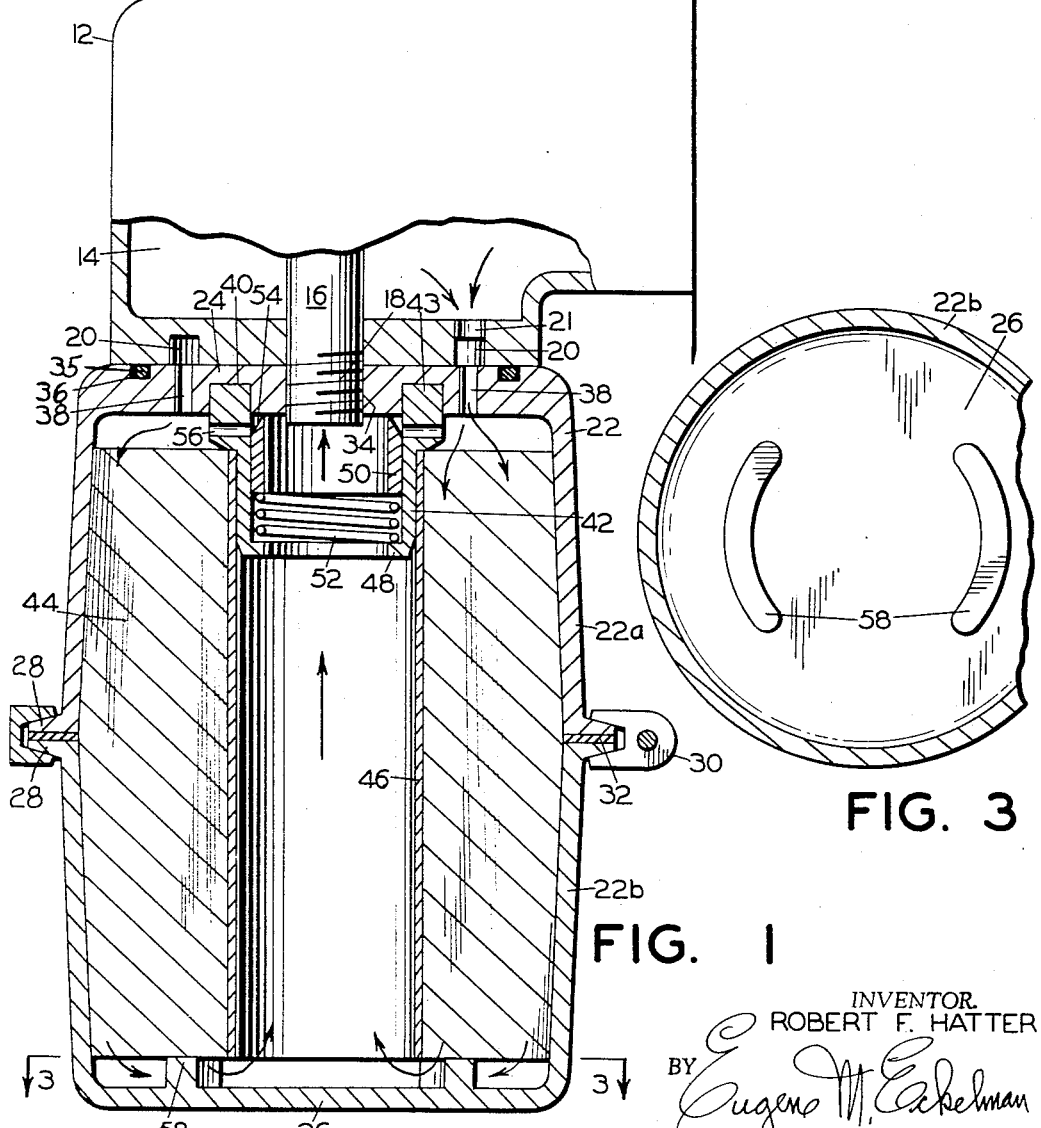
INVENTOR.
ROBERT F. HATTER
BY Eugene M. Eckelman
ATTORNEY

United States Patent Office 3,405,805
Patented Oct. 15, 1968

3,405,805
FILTER
Robert F. Hatter, Box 464, St. Helens, Oreg. 97051
Filed Dec. 19, 1966, Ser. No. 603,008
2 Claims. (Cl. 210—130)

ABSTRACT OF THE DISCLOSURE

The oil filter of the invention has a cylindrical body portion for receiving a toilet tissue roll as the filtering media. The body portion has end walls one of which has inlet and outlet openings. This latter end wall has a hollow valve housing secured thereto, and such housing is adapted to be frictionally fitted inside one end of the impervious core of the toilet tissue roll. A tubular open-ended, spring-pressed insert is slidable in the housing and has a beveled end portion arranged to uncover by-pass ports in the housing should the filter become plugged.

---

This invention relates to new and useful improvements in filter constructions for engines.

Filters heretofore employed on engine structures have utilized rolls of tissue paper, such as toilet tissue, for the filtering media in view of the effectiveness of such rolled paper for this purpose. The filter systems used are generally of two types. A first type comprises a by-pass system wherein a small portion of the oil is by-passed from a main line through the filter. The second type comprises a full flow system wherein the filter is in the main line of circulation and all the oil must pass through the filter. A disadvantage of the by-pass system is that the filter must be connected independently to the engine by means of external oil lines. Such is a costly setup, and also the external lines are subject to failure. An advantage of the full flow system is that the filter can be attached directly to the engine block without external oil lines. However, in a full flow system, if the media becomes clogged, oil flow to the engine is cut off and the engine may be damaged.

It is a primary objective of the present invention to provide a filter designed particularly for use in a full flow filter system which employs a novel internal construction for association with a roll of tissue paper as the filtering media and which has a novel valve structure arranged to open under abnormal pressure and allow oil to by-pass the filter media in the event that the latter becomes clogged.

Another object of the present invention is to provide a filter of the type described which will readily fit on most existing vehicle engines and also is capable of being mounted in place on the existing filter support means.

Another object of the present invention is to provide a filter of the type described which is simplified in construction and inexpensive to manufacture.

Additional objects and advantages will become apparent from the following description taken in connection with the accompanying drawings which illustrate a preferred form of the invention.

In the drawings:

FIGURE 1 is a longitudinal sectional view of a filter embodying principles of the present invention, the filter being shown mounted on an existing support portion of an engine and a valve mechanism in the filter being shown in normal filtering operation;

FIGURE 2 is an enlarged, fragmentary sectional view of the valve mechanism, such mechanism being shown in open position to by-pass the oil around the filter media when the latter has become clogged; and FIGURE 3 is a sectional view taken on the line 3—3 of FIGURE 1.

Referring now in particular to the drawings, the numeral 10 designates an engine block and the numeral 12 designates a filter support housing 12 of conventional construction on the block. Such housing includes an inlet area 14 to which oil is introduced from the engine oil pan by suitable pump means, not shown. Housing 12 also includes a return pipe 16 which leads to the oil pan for returning filtered oil. This pipe has a threaded portion 18 which projects beyond the end surface of the housing 12. An annular oil passageway 20 is provided in the end surface of the housing 12 and communicates with the inlet area 14 by ports 21. The structure thus far described is conventional on engines using the full flow filtering system.

The present filter will now be described. Such filter comprises a cylindrical body member or container 22 having end walls 24 and 26. The body member 22 is formed in two parts 22a and 22b and these two parts have flanges 28 on their open ends serving to secure them together releasably by clamp means 30 engageable with the flanges. A gasket 32 is provided between the flanges to provide a tight seal.

End wall 24 has a threaded central bore 34 adapted for engagement with the threaded end 18 of the pipe 16, whereby the present filter can be mounted on the filter support housing 12 in the place of an existing filter merely by unthreading the latter and then threadedly attaching the body member 22. The diameter of the threaded bore 34 is of selected dimension so as to fit the existing threaded projection 18. To provide an oil tight engagement of the body member 22 with the support housing 12, a gasket 35 is seated in a recess 36 provided in the outer end surface of wall 24 and has sealing engagement with the end surface of support housing 12. Disposed toward the center of the end wall 24 from the gasket 35 are ports 38 arranged in a circular pattern and communicating with oil passageway 20.

Thus, with the filter installed, oil is pumped from the engine to the support housing 12 and then into the interior of the body member 22 by means of oil inlets 20, 21 and 38.

Inwardly toward the center of the end wall 24 from the inlet ports 38 and on the inner surface of this end wall is an annular recess 40 into which is fitted a valve housing 42. As seen in FIGURE 1, recess 40 is concentric with the axis of the body member 22. Preferably, valve housing 42 has an enlarged or thickened end portion 43 fitted tightly in the recess 40 to serve as a centering and holding member for a roll of tissue paper 44 such as toilet tissue. The outside diameter of the valve housing 42 is of selected dimension such as to receive the tissue roll 44 in a substantially tight fit. Toilet tissue rolls of conventional construction have a tubular core 46 open at the ends and formed of a substantially impervious material and for the present purpose oil, after having traveled through the filter portion, is carried directly away through such core, as will be described in more detail hereinafter.

Valve housing 42 is open ended but at its free or non-supported end has an inturned flange or lip 48. Slidably disposed within the housing 42 is a tubular open-ended insert 50 urged upwardly into engagement with the inner surface of end wall 24 of the housing by a helical compression spring 52 confined between the flange 48 and the one edge of the insert. The end of the insert which engages the end wall of the body 22 has a beveled portion 54, and disposed in the side walls of the valve guide 42 closely adjacent the mounted end thereof are a plurality of ports 56. These ports are provided in the enlarged or thickened end portion 43 of the valve housing. As seen in FIGURE 1, these ports and the beveled portion 54 of the valve guide are dimensioned and arranged such that in the engaging position of the valve insert with the end wall 24 the beveled portion 54 is in the plane of ports 56 whereby, when an oil pressure of abnormal range develops within the body 22, such as when the filter 44 is clogged, the oil pressure bearing on the beveled portion 54 urges the valve insert downwardly against the action of the spring to permit oil to flow directly out again and by-pass the filtering media.

The longitudinal dimension of the body member 22 is greater than the length of the roll of toilet tissue to be inserted therein in order that space is provided in the housing at each end of the roll. Enlarged end portion 43 of the valve housing serves as an abutment for the one edge of the toilet tissue so that the ports 56 cannot be covered by the tissue roll.

The end wall 26 has at least two segmental ribs or short posts 58 which serve to support the tissue roll 44 off the end of the wall 26 and permit circulation of the oil through the tissue roll and up through the core 46.

In operation of the present filter, it may be substituted for an existing filter merely by removing the latter and threadedly engaging the present filter on the threaded mounting pipe 18. As the engine is run, the oil is circulated through the filter to clean the oil. In such cleaning operation oil is forced through the passageway 20 and ports 38 and then through the tissue roll parallel to the sheets thereof. The oil emerges from the far end of the roll and then circulates up through the core 46 and back into the oil pan through the pipe 16. The normal operating position of the parts is shown in FIGURE 1. In the event that the tissue roll 44 becomes clogged before replacement, oil pressure will build up in the body member and when the pressure reaches a certain amount, the force thereof on beveled surface 54 moves the valve insert 50 away from the wall 24 whereby oil is allowed to escape back into return pipe 16. The forced open position of the valve is shown in FIGURE 2. It is to be understood of course that the spring 52 is of a strength adequate to hold the valve insert normally seated against the wall 24 but at the same time allows the pressure responsive insert to move an amount sufficient for the intended purpose.

To substitute a clean tissue roll for a used one, the clamp 30 is merely removed and the dirty filter taken out. In changing the filters, it is not necessary to remove the body 22 from the support housing 12.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. An oil filter comprising
   (a) a cylindrical body member closed at its ends by a pair of end walls,
   (b) a roll of paper tissue replaceably disposed in the body member as the filter element,
   (c) said roll having an outer diameter substantially equal to the inner diameter of said body member to provide a seal along the said inner diameter of the body member,
   (d) a substantially impervious tubular center core in said paper tissue roll,
   (e) said paper tissue roll being of less length than the distance between the end walls of said body member and providing an inlet area at one end and an outlet area at the other end to permit oil to circulate lengthwise through the roll and return through the tubular core,
   (f) one of said end walls having oil inlet means therein communicating with the said inlet area,
   (g) said one end wall having oil outlet means therein aligned with said center core of said roll,
   (h) a tubular valve housing depending from said one end wall into one end of said core in frictional sealing engagement therewith and establishing communication between said center core and said oil outlet means,
   (i) said valve housing having port means arranged to establish communication between said inlet area and said outlet means,
   (j) a spring-pressed valve insert slidably mounted in said housing,
   (k) said valve insert having a bevelled end portion in the plane of and facing said port means,
   (l) said valve insert being constructed and arranged for normally shutting off the flow of oil between said inlet area and said outlet means and being constructed to be slidable in said housing upon abnormal pressure conditions in the body member bearing on said bevelled end portion to permit direct flow of oil from said inlet area to said outlet means.

2. An oil filter comprising
   (a) a cylindrical body member closed at its ends by a pair of end walls,
   (b) a roll of paper tissue replaceably disposed in the body member as the filter element,
   (c) said roll having an outer diameter substantially equal to the inner diameter of said body member to provide a seal along the said inner diameter of the body member,
   (d) a substantially impervious tubular center core in said paper tissue roll,
   (e) said paper tissue roll being of less length than the distance between the end walls of said body member to provide a space at each end of said roll and permit oil to circulate lengthwise through the roll and then return through the tubular core,
   (f) one of said end walls having oil inlet means therein aligned with the filtering portion of said roll,
   (g) said one end wall having oil outlet means therein aligned with said center core of said roll,
   (h) a tubular valve housing depending from said one end wall into one end of said core in sealing relation therewith and establishing communication between said center core and said oil outlet means,
   (i) a spring-pressed valve insert slidably mounted in said housing,
   (j) said valve housing having ports arranged to establish communication between said oil inlet and outlet means,
   (k) said valve insert having a bevelled end portion in the plane of and facing said ports,
   (l) said valve insert being constructed and arranged for normally shutting off the flow of oil through said ports communicating between said oil inlet and outlet means while at the same time allowing filtered oil flow to said outlet means through the tubular core,
   (m) said valve insert being constructed to be slidable in said housing upon abnormal pressure conditions in the body member bearing on said bevelled end portion to permit direct flow of oil from said oil inlet means to said oil outlet means.

References Cited

UNITED STATES PATENTS

| | | | |
|---|---|---|---|
| 1,753,809 | 4/1930 | Short | 210—494 X |
| 2,110,009 | 3/1938 | Weidenbacker | 210—131 |
| 2,661,846 | 12/1953 | Lash et al. | 210—494 X |
| 2,738,879 | 3/1956 | Frantz | 210—494 X |
| 2,793,752 | 5/1957 | Jay | 210—130 |
| 2,801,006 | 7/1957 | Hultgren et al. | 210—438 X |
| 3,184,062 | 5/1965 | Humbert | 210—130 |
| 3,272,342 | 9/1966 | McLaren et al. | 210—440 |
| 3,317,045 | 5/1967 | Dummler | 210—130 |

FOREIGN PATENTS 950,810   2/1964   Great Britain.

REUBEN FRIEDMAN, *Primary Examiner.*

W. S. BRADBURY, *Assistant Examiner.*